April 8, 1924.

W. F. FRUEN 1,489,754

APPARATUS FOR DISPENSING DRINKING WATER

Filed Sept. 12, 1921  2 Sheets-Sheet 1

INVENTOR:
W. F. FRUEN.
BY Whiteley and Ruckman
ATTORNEYS.

April 8, 1924. 1,489,754
W. F. FRUEN
APPARATUS FOR DISPENSING DRINKING WATER
Filed Sept. 12, 1921 2 Sheets-Sheet 2
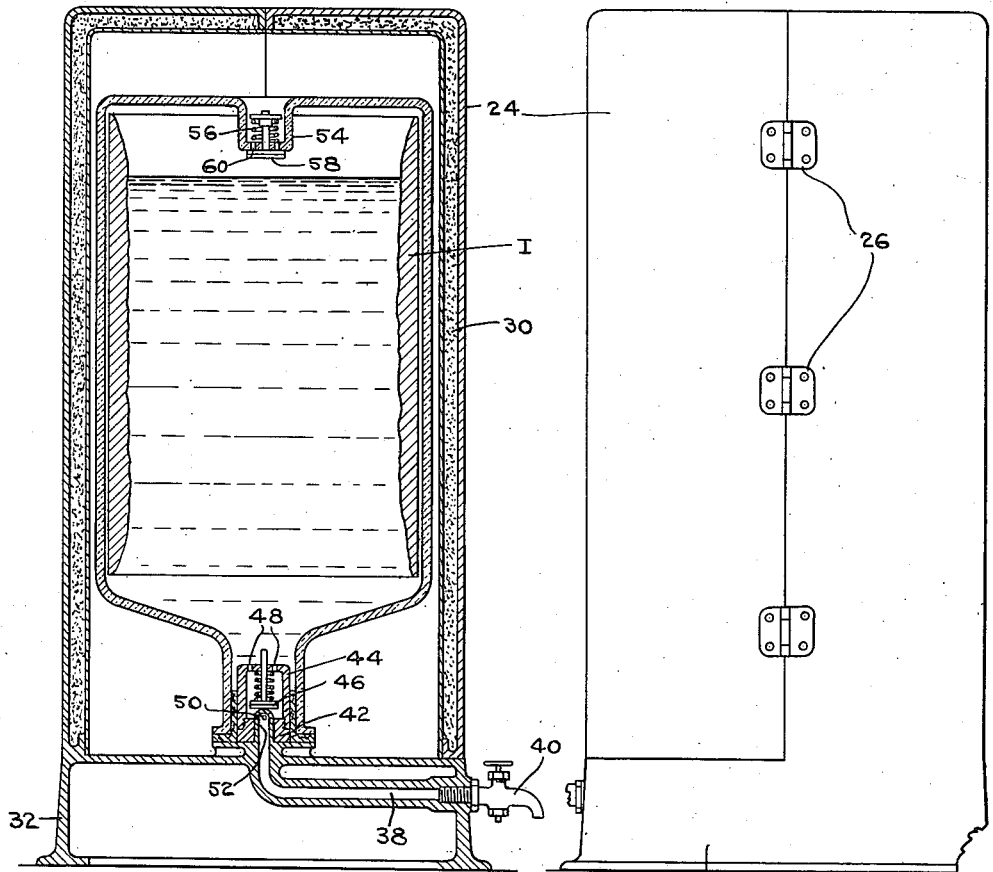
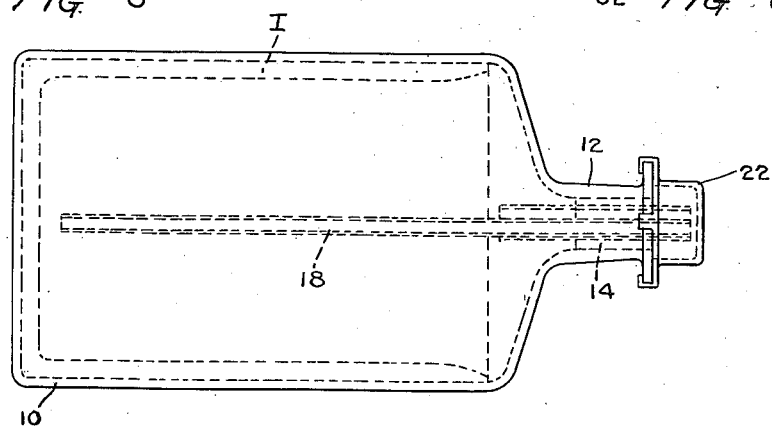
INVENTOR:
W. F. FRUEN.
By Whiteley and Ruckman
ATTORNEYS.

Patented Apr. 8, 1924.

1,489,754

UNITED STATES PATENT OFFICE.

WILLIAM F. FRUEN, OF MINNEAPOLIS, MINNESOTA.

APPARATUS FOR DISPENSING DRINKING WATER.

Application filed September 12, 1921. Serial No. 500,198.

*To all whom it may concern:*

Be it known that I, WILLIAM F. FRUEN, a citizen of the United States, residing at Minneapolis, in the county of Hennepin and State of Minnesota, have invented certain new and useful Improvements in Apparatus for Dispensing Drinking Water, of which the following is a specification.

My invention relates to apparatus for dispensing drinking water. An object of my invention is to provide for cooling the water for consumption by forming a portion of it into ice within a suitable container before delivery to the consumer, thus dispensing with the present system of cooling by passing the water through an iced tank. In carrying out my invention, a suitable refrigerating apparatus is installed at the plant or central station, and a portion of the water in filled containers is frozen. These containers with the ice and water therein are then transported to the place where the drinking water is to be used by the consumer. At the latter place, the water container is preferably placed in a heat insulated casing or holder having provision for making a faucet connection with the water container so that the cooled water may be readily drawn off as required for drinking purposes.

The full objects and advantages of my invention will appear in connection with the detailed description and the novel features embodied in my inventive idea will be particularly pointed out in the claims.

Figure 1:
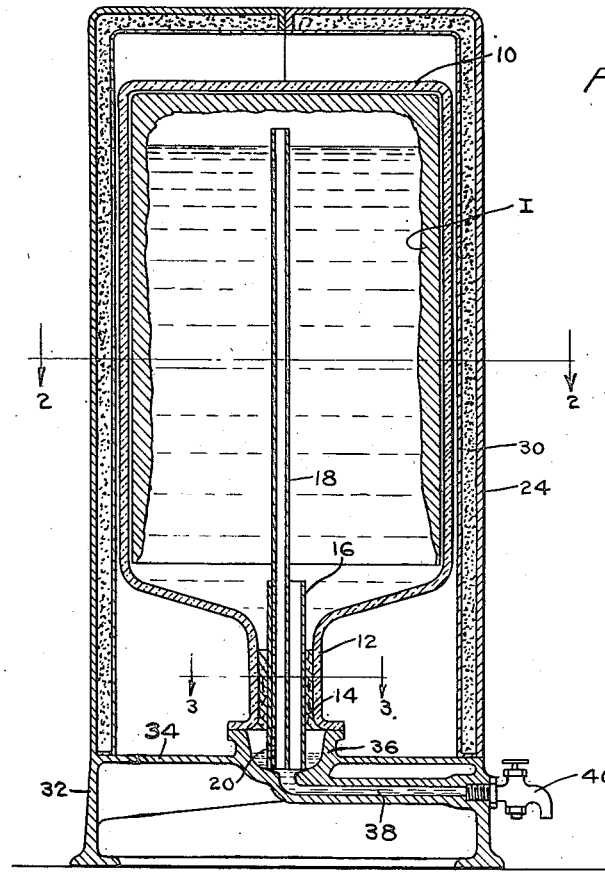
Figure 2:
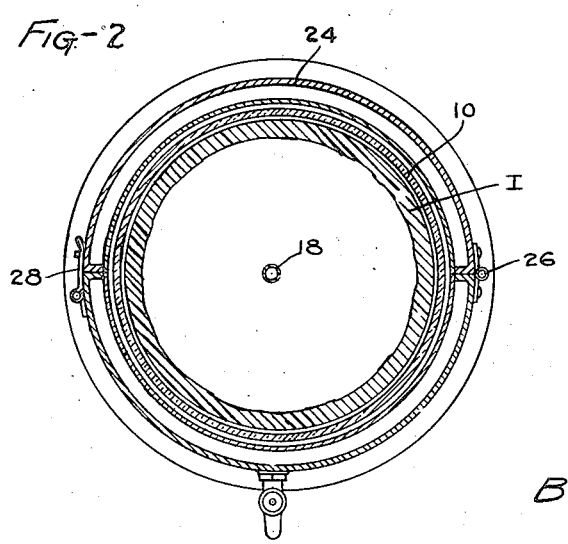
Figure 3:
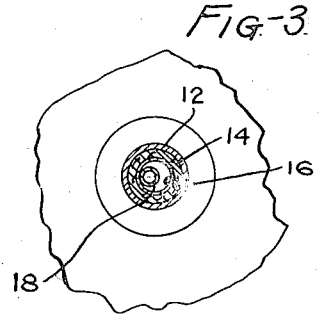

In the accompanying drawings which illustrate the apparatus for use in connection with my invention, Fig. 1 is a view in central vertical section through a water container in place within an insulated casing. Fig. 2 is a view in section on the line 2—2 of Fig. 1. Fig. 3 is a view in section on the line 3—3 of Fig. 1. Fig. 4 is an elevational view of a water container fitted for transporting. Fig. 5 is a view in central vertical section of a modification. Fig. 6 is an elevational view of the insulated casing showing the exterior thereof as it appears when used with either form of water container.

The accompanying drawings illustrate two forms of containers which I may employ in connection with my invention, and reference will be made first to the construction shown in Figs. 1 to 4. A water container shown in the form of a bottle is designated by the numeral 10, this bottle having a neck 12 which is provided with a stopper 14. Extending through this stopper is a short tube 16 and a long but smaller tube 18. In the embodiment shown, the tube 18 is placed eccentrically within the tube 16 and the two tubes are secured together and provided with a common opening at 20 outside the neck of the bottle. When the bottle is being transported to the place where the water is to be used, the open outer ends of the tubes 16 and 18 are covered by a cap 22 which is secured to the neck of the bottle as shown in Fig. 4. When the bottle is delivered to the consumer, it is inverted and placed in a casing 24 made in two parts provided with hinges 26 and with a catch 28. The casing can thus be opened to permit insertion of the water container and then latched in closed position. When closed, the two parts of the casing do not fit absolutely air tight whereby sufficient air may enter to prevent the formation of a vacuum in the bottle as the water is drawn off. The casing is provided with hollow walls filled with heat insulating material 30 and it has a base member 32 adapted to rest upon a suitable support so that the water may be conveniently drawn off from time to time as required for drinking purposes. The top of the base member has a partition 34 provided with a central well having a wall 36 upon which the neck of the bottle is adapted to rest when the latter is inverted and placed in the casing. From the bottom of this well, a passageway 38 leads out through the base and at its outer end is provided with a faucet 40. When the faucet is open, water which has been chilled by the layer of ice I frozen inside the bottle flows out into a drinking glass or other receptacle and air enters the opening 20 and passes up the tube 18 so as to prevent the formation of a vacuum at the top of the bottle.

As the ice melts any sediment frozen therein will drop between the inside of the neck of the bottle and the upper portion of the tube 16 and thus be prevented from being drawn off with the drinking water.

In the modification shown in Fig. 5, the neck of the bottle is provided with a valve seat member 42 and a valve cage 44 containing a spring-pressed valve 46. When the bottle is placed in the casing 24, the water is permitted to flow out through openings 48 in the valve cage and openings 50 in the end of a nipple 52 which extends through a hole in the valve seat and presses against the valve to open it. The nipple 52 is connected with the passageway 38 leading to the faucet 40 in a similar manner to to that described in connection with the form shown in Figs. 1 to 4. The bottom of the bottle in the form shown in Fig. 5 is provided with a hollow inwardly extending projection 54 which contains a spring 56 surrounding the stem of a valve 58 adapted to seat upon the inner surface of a projection 54 and close openings 60 therein. When a vacuum tends to form in the bottle, atmospheric pressure causes the valve 58 to open and permit air to flow into the bottle, In this form of construction, ice I is frozen only inside of the side wall of the bottle, and does not extend within the bottom thereof as in the form previously described. As the ice melts, any sediment frozen therein will drop between the inside of the neck of the bottle and the valve cage 44 and thus be prevented from being drawn off with the drinking water.

I claim:

An apparatus for dispensing drinking water comprising a bottle-shaped container, for holding water and a layer of ice frozen therein, a casing for receiving said container in inverted position with the mouth downward, a base member beneath said casing, a partition at the top of said base member constituting a bottom for said casing, a central hollow projection extending upwardly from said partition and upon which the mouth of the bottle is supported, a tubular member below said partition which leads from said hollow projection to the outside of said base member, a faucet attached to the outer end of said tubular member, and means extending through the mouth of said container for permitting water to flow therefrom into said tubular member and air to flow from said tubular member into said container.

In testimony whereof I hereunto affix my signature.

WILLIAM F. FRUEN.